Figure 1:
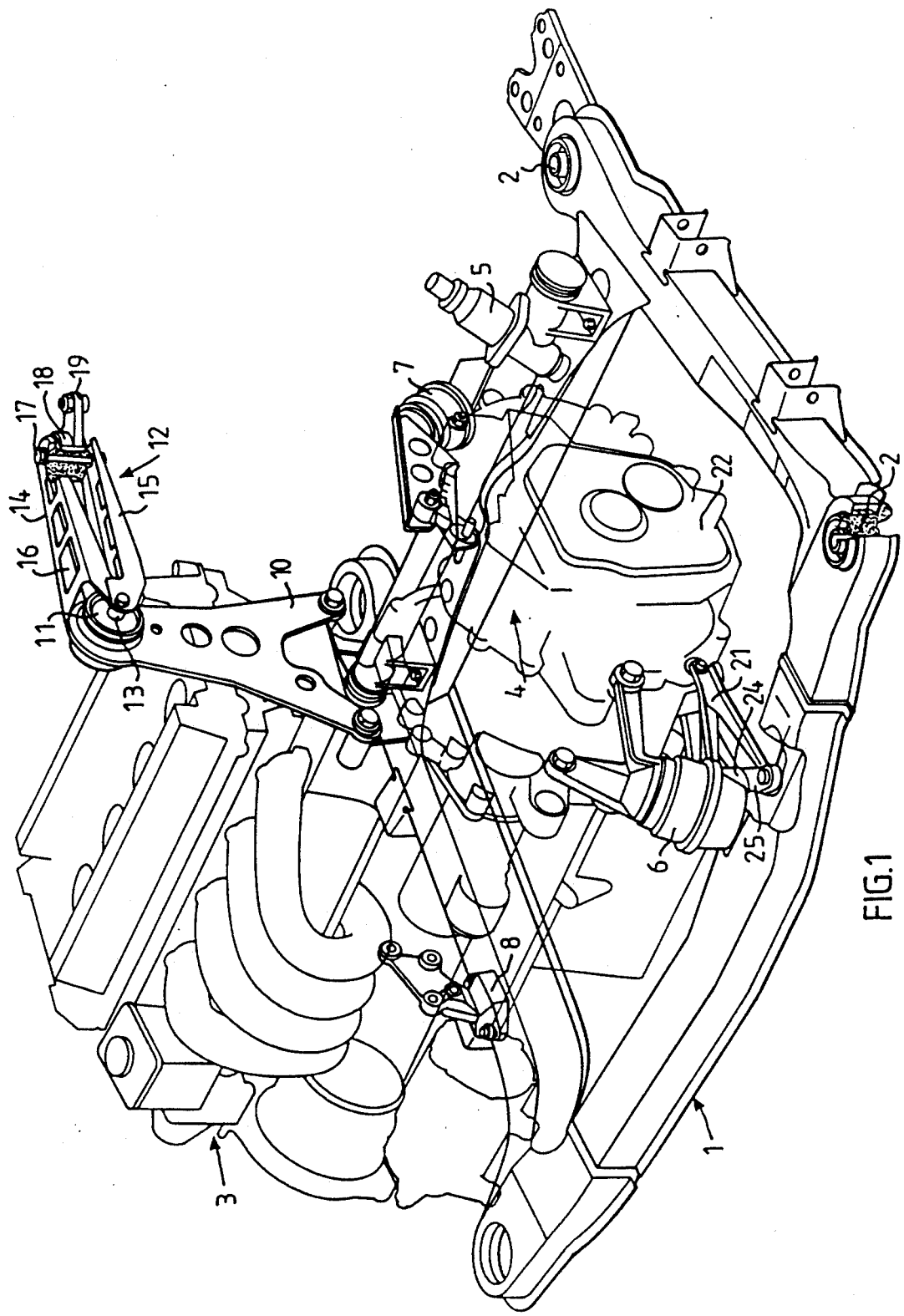

United States Patent [19]

Arvidsson et al.

[11] Patent Number: 5,133,427
[45] Date of Patent: Jul. 28, 1992

[54] VEHICLE ENGINE SUSPENSION DEVICE

[75] Inventors: Hans-Olof Arvidsson; Göran Sjöstrand, both of Göteborg, Sweden

[73] Assignee: AB Volvo, Göteborg, Sweden

[21] Appl. No.: 476,388

[22] PCT Filed: Dec. 1, 1988

[86] PCT. No.: PCT SE88/00658

§ 371 Date: May 30, 1990

§ 102(e) Date: May 30, 1990

[87] PCT Pub. No.: WO89/05246

PCT Pub. Date: Jun. 15, 1989

[30] Foreign Application Priority Data

Dec. 3, 1987 [SE] Sweden ................. 8704846

[51] Int. Cl.⁵ .............................. B60K 5/12
[52] U.S. Cl. ................. 180/297; 180/300; 248/603; 267/292
[58] Field of Search ......... 180/299, 300, 297; 248/603, 638, 671; 267/292, 293, 294

[56] References Cited

U.S. PATENT DOCUMENTS 3,825,090  7/1974  Runkle et al. ............. 180/300 X
4,240,517 12/1980  Harlow, Jr. et al. .......... 180/295
4,901,814  2/1990  Brook et al. ............... 180/300 X

FOREIGN PATENT DOCUMENTS 0077052  4/1983  European Pat. Off. .
3621317  1/1987  Fed. Rep. of Germany .
525027   4/1955  Italy ..................... 180/299
59-29835 2/1984  Japan .
2126546  3/1984  United Kingdom .

Primary Examiner—Andres Kashnikow
Assistant Examiner—Michael Mar
Attorney, Agent, or Firm—Young & Thompson

[57] ABSTRACT

A vehicle engine suspension for a transverse engine has at least three engine cushions (6, 7, 8) which support the engine (3) and take up vertical loads exerted by the engine. A first torque brace (12) extends transversely to the main axis of the engine and is pivotally connected between the engine and the vehicle chassis or vehicle body. A second torque brace (21) extends transversely to the main axis of the engine (3) and is pivotally connected between the engine and the vehicle chassis or vehicle body. This second brace is located at a level beneath the first brace (12) and lies in the same upright plane as that first brace. This upright plane is disposed at right angles to a horizontal plane (H) which is the nearest common plane of the engine cushions (6, 7, 8).

3 Claims, 2 Drawing Sheets

VEHICLE ENGINE SUSPENSION DEVICE

The present invention relates to a vehicle engine suspension for a transverse engine which comprises at least three engine cushions which support the engine and which are intended to take up vertically acting loads from the engine, and which further comprises a torque brace which extends transversally to the main axis of the engine and is pivotally connected between the engine and the vehicle chassis or vehicle body.

The purpose of the torque brace of such engine suspensions, which are used in front wheel drive vehicles fitted with transverse engines, is to take up part of the reaction torque from the engine drive shafts, thereby to restrict twisting or like rotation of the engine about its axis when the engine is sharply accelerated or braked. In the case of one known construction, the torque brace is attached at one end to the upper part of the engine and extends rearwardly to an attachment located in the vehicle body. In this particular instance, the reaction torque is taken up partly by the torque brace and partly by a pair of lower engine cushions located forwardly and rearwardly of the engine. Dampened engine cushions, however, are primarily constructed to take up solely compression forces, i.e. vertically acting loads from the engine. When the engine is accelerated or retarded sharply, the engine cushions are subjected to heavy shear forces and it is necessary to fit the cushions with deflection restrictors, in order to prevent the cushions from being damaged. When these deflection restrictors come into operation, however, the vibration damping ability of the cushions is impaired and engine vibrations are transmitted to the vehicle chassis.

The object of the present invention is to provide a solution which will enable the torque absorbing and vibration damping functions of an engine suspension of the aforesaid kind to be divorced from one another without detracting from the function in other respects, so that suspension components can be configured without compromising the intended function.

This object is achieved in accordance with the invention with the aid of a second torque brace which extends transversely to the main axis of the engine and is pivotally connected between the engine and the vehicle chassis or the vehicle body, said second torque brace lying on a level beneath the first brace and at least substantially in the same vertical plane as said brace.

This solution enables the lower engine cushions to be constructed in a manner to be gently responsive linearly and therewith capable of taking up vertically acting vibrations. Positioning of the torque braces in mutually the same plane eliminates the occurrence of a force couple which strives to rotate or twist the engine about a vertical axis. It is important to avoid such twisting of the engine, particularly when the engine is carried by an intermediate frame which is isolated in the vehicle chassis and which also carries the steering transmission, since twisting of the engine will result in significant steering effects which change direction in response to changes between vehicle acceleration and retardation.

According to one preferred embodiment of the invention, the torque braces are located in a plane which extends at least substantially at right angles to a plane which is the nearest common plane to the engine cushions. In practice, this latter plane is essentially horizontal and the embodiment thereby enables the functions of the torque braces to be disengaged vertically.

Figure 2:
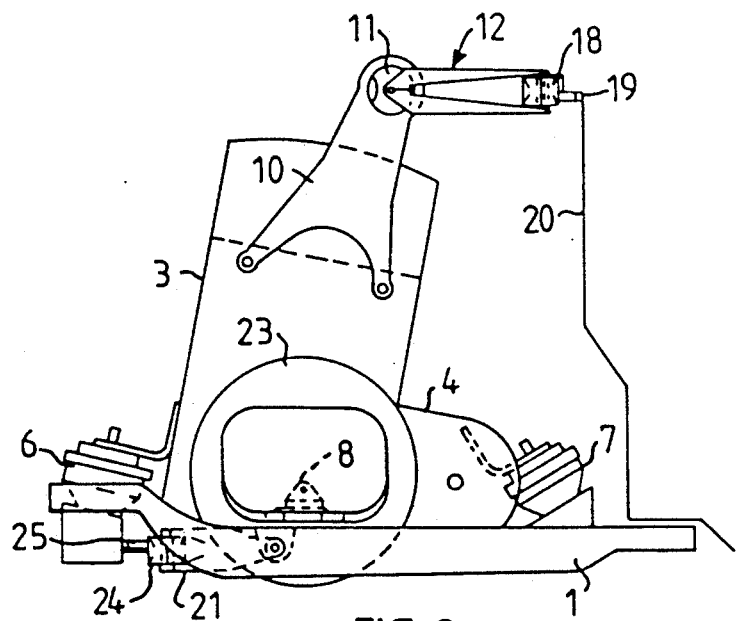
Figure 3:
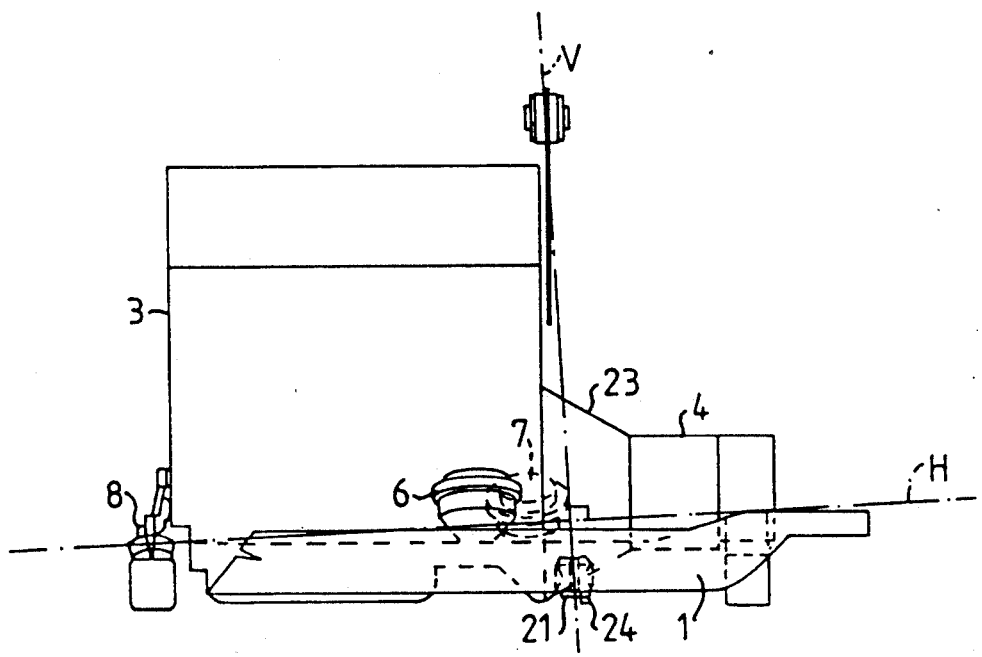

The invention will now be described in more detail with reference to the accompanying drawings, in which FIG. 1 is a perspective view of one embodiment of an inventive engine suspension, and FIGS. 2 and 3 are respectively a schematic side view and front view of said engine suspension.

The illustrated engine suspension includes an intermediate frame 1 which is intended to be attached to the vehicle chassis with the aid of vibration damping bushes 2, one in each corner of the frame. The frame 1 supports the engine 3 together with gear box 4 and vehicle steering transmission 5.

Each of a pair of dampened engine cushions 6, 7 is mounted respectively forwardly and rearwardly of the engine as seen in the axis direction of the vehicle—and extend between the engine and the frame. The main purpose of the cushions is to dampen movement of the engine in the vertical direction and the cushions are preferably of the liquid damping kind. The cushions 6, 7 are positioned on respective sides of a vertical plane parallel with the crankshaft, through the common centre of gravity of the engine and gear box. A third cushion 8 is mounted between the forward edge surface of the engine and the right-hand side of the frame 1, the purpose of this third cushion being to impart to the engine a suitably natural frequency in the rolling direction of the vehicle. The cushion 8 may also be a liquid damping cushion, although not necessarily so. The cushions 6, 7, 8 are located in a plane H, which in the case of the illustrated embodiment (See FIG. 3) is not completely horizontal, but slopes slightly to the right—as seen forwardly of the vehicle (to the left, seen in FIG. 3).

Firmly screwed to the left-hand side of the engine block, above the gear box 4, is a Y-shaped brace 10 which carries at its upper end a resilient bush 11 to which an upper torque brace 12 is attached by means of a horizontal bolt 13. The brace 12 comprises two parts 14, 15 which are perforated at 16 to reduce the weight thereof and which are held together by the bolt 13 and also by a vertical bolt 17 extending through a resilient bush 18 which is secured to the vehicle chassis or vehicle body by means of a bracket 19, or more specifically to the rear defining wall 20 of the engine compartment, as illustrated schematically in FIG. 2. In order to prevent the brace deforming the wall 20, in the event of a collision, to an extent such as to loosen the windscreen attachment at the upper edge of said wall, the brace is dimensioned to buckle at a load capable of being withstood by the wall 20 without appreciable deformation in the region of windscreen attachment.

According to the invention a second torque brace 21 is mounted between the engine/gear box and the vehicle chassis/body. In the case of the illustrated embodiments, one end of the brace 21 is pivotally screwed to the clutch housing 23 of the gear box 4 (FIGS. 2 and 3). The other end of the brace 21 is connected to a resilient bush 24 which is secured to a bracket 25, which in turn is screwed firmly to the frame 1. In this case, the frame 1 functions as the connecting arm or link between the torque brace 21 and the vehicle body/chassis. In the case of engine suspensions which do not include an intermediate frame, the outer end of the torque brace is connected directly to the vehicle body/chassis. As will be seen from FIG. 3, the torque braces 12 and 21 lie in a common plane B transversely to the engine main axis. The plane V is also perpendicular to the plane H of the cushions 6, 7, 8. This means partly that the torque braces are essentially disengaged vertically, i.e. the braces exert to other forces counteractive of vertical engine movement than those forces which result from the rigidity of the pivot-functioning resilient bushes and which are negligible in the present context, and partly that the torque braces are unable to generate force couples which strive to twist or rotate the engine about a vertical axis, a phenomenon which would otherwise result in steering effects.

We claim:

1. In a vehicle engine suspension for a transverse engine comprising at least three engine cushions (6, 7, 8) which support the engine (3) and are adapted to take up vertical loads exerted by the engine, and further comprising at least one first torque brace (12) which extends transversely to the main axis of the engine and is pivotally connected between the engine and the vehicle chassis or vehicle body; the improvement comprising a second torque brace (21) which extends transversely to the main axis of the engine (3) and which is pivotally connected between the engine and the vehicle chassis or vehicle body, said second brace being located at a level beneath the first brace (12) and lying in substantially the same upright plane as said first brace, said upright plane being disposed substantially at right angles to a substantially horizontal plane (H) which is the nearest common plane of the engine cushions (6, 7, 8).

2. An engine suspension according to claim 1, wherein the torque braces (12, 21) are oppositely directed; the upper brace (12) is secured to the vehicle body or vehicle chassis; and the lower brace (21) is secured to the vehicle body or the vehicle chassis through the intermediary of an intermediate frame (1) which carries the engine cushions (6, 7, 8)

3. An engine suspension according to claim 1, wherein the torque brace has pivot connections which include resilient bushes (11, 18, 24).

* * * * *